Figure 1:
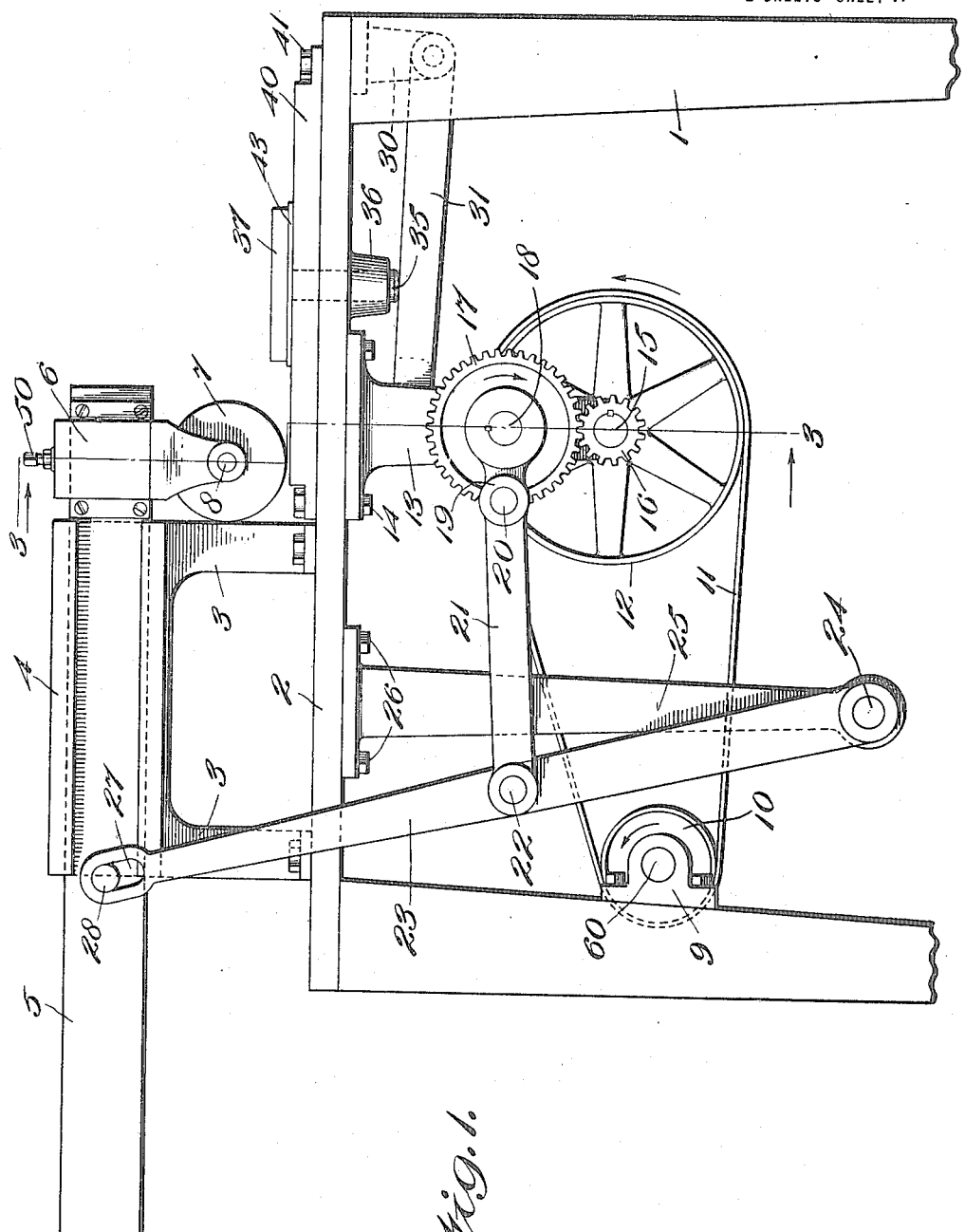

O. B. RONEY.
APPARATUS FOR CUTTING PATTERNS.
APPLICATION FILED AUG. 2, 1915. RENEWED MAY 6, 1916.

1,208,019.

Patented Dec. 12, 1916.
2 SHEETS—SHEET 1.

Inventor
Oscar B. Roney, by
Attorney

O. B. RONEY.
APPARATUS FOR CUTTING PATTERNS.
APPLICATION FILED AUG. 2, 1915. RENEWED MAY 6, 1916.
1,208,019.
Patented Dec. 12, 1916.
2 SHEETS—SHEET 2.
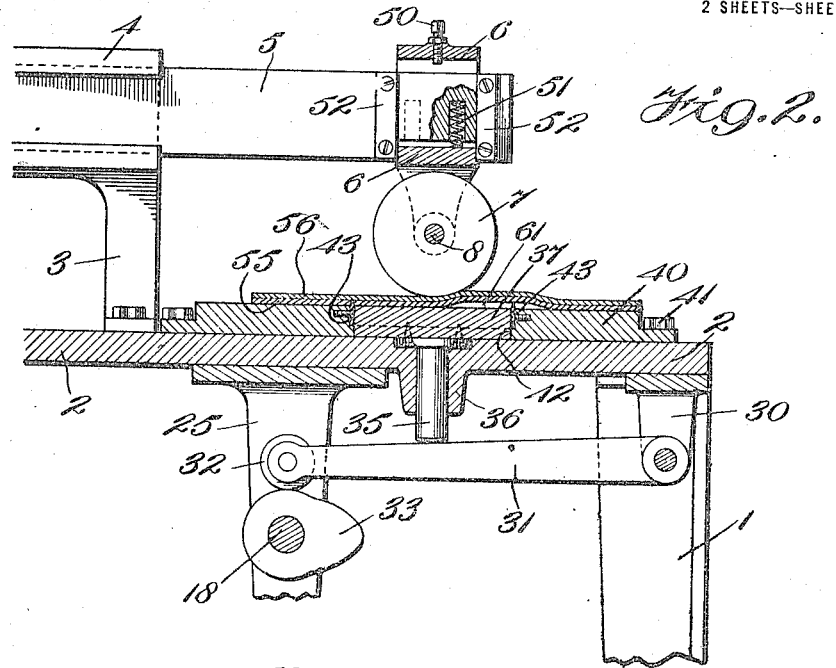
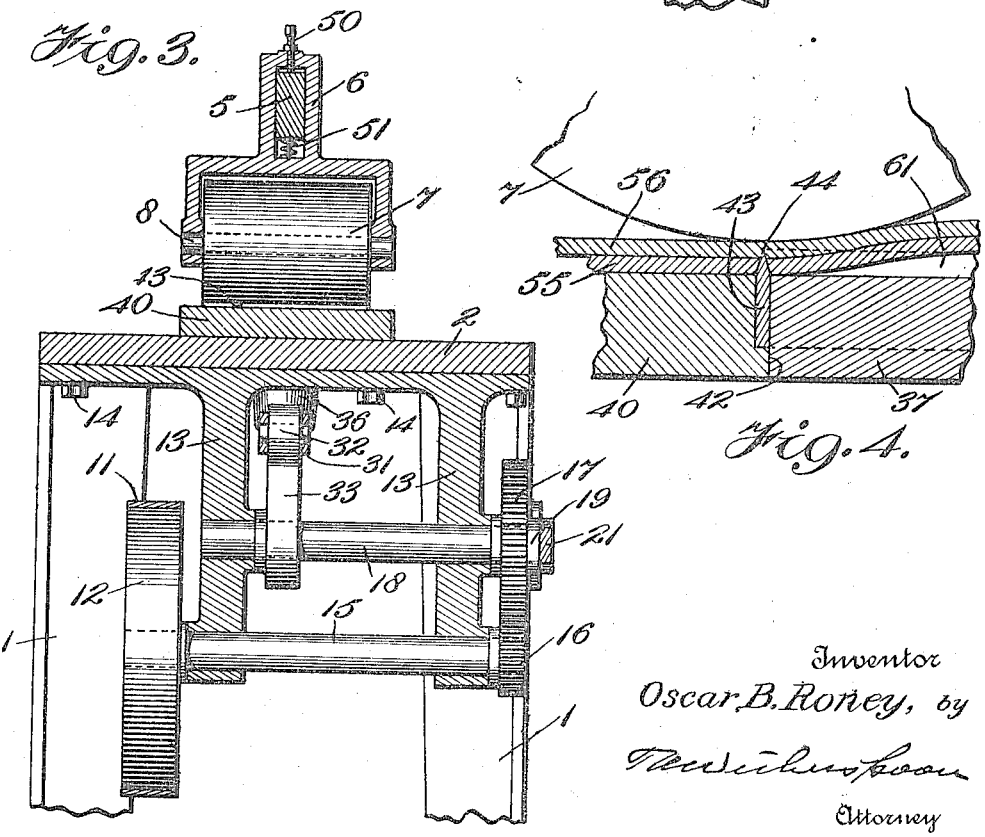
Inventor
Oscar B. Roney, by
Attorney

[UNITED STATES PATENT OFFICE.

OSCAR B. RONEY, OF OLNEY, ILLINOIS.

APPARATUS FOR CUTTING PATTERNS.

1,208,019.
Specification of Letters Patent.
Patented Dec. 12, 1916.

Application filed August 2, 1915, Serial No. 43,204. Renewed May 6, 1916. Serial No. 95,919.

*To all whom it may concern:*

Be it known that I, OSCAR B. RONEY, a citizen of the United States, residing at Olney, in the county of Richland and State of Illinois, have invented certain new and useful Improvements in Apparatus for Cutting Patterns; and I do hereby declare the following to be a full, clear, and exact description of the invention, such as will enable others skilled in the art to which it appertains to make and use the same.

This invention relates to a machine for cutting leather and similar sheet material, and has for its object to provide an apparatus which will be simple in construction, comparatively inexpensive to manufacture and more efficient in use than those that have been heretofore proposed.

With these and other objects in view the invention consists in the novel parts, combinations of parts, and method constituting my invention, all as will be fully hereinafter disclosed and particularly pointed out in the claims.

Referring to the accompanying drawings forming a part of this specification, in which like numerals designate like parts in all the views—Figure 1 is a diagrammatic side elevational view of a machine made in accordance with my invention; Fig. 2 is a sectional detail view partly in elevation showing the cutting dies and the method of operation of the machine; Fig. 3 is a sectional end elevational view taken on the line 3—3 of Fig. 1, looking in the direction of the arrow; and Fig. 4 is an enlarged detail sectional view illustrating the method of operation of the machine.

1 indicates any suitable supports on which is mounted the table or base 2 carrying the brackets or supports 3 having the guide members 4 between which the bar 5 reciprocates. Suitably mounted on the bar 5 as by means of the member 6 is the cutting roller 7 pivoted to said member 6 as at 8.

Conveniently mounted on the supports 1 is the journals or brackets 9 carrying a roller 10 around which the belt 11 passes. Said belt also passes around the pulley 12 journaled in the supports or brackets 13 bolted as at 14 to the table 2 and provided with the shaft 15 as shown.

16 represents a pinion rigid with the shaft 15 meshing with the gear 17 mounted on the shaft 18 journaled in said brackets 13 and carrying the crank arm 19 to which is pivoted as at 20 the link 21 pivoted as at 22 to the operating lever 23 pivoted as at 24 to the depending bracket 25 secured as at 26 to the said table or base 2. The upper end of the said lever 23 is conveniently slotted as at 27 and engages a pin 28 rigid with the reciprocating bar 5, all as will be clear from the drawings. Also, pivotally mounted on the bracket 30 depending from the table 2 is the operating lever 31 carrying at its outer end the roller 32 adapted to be operated by the cam 33 carried by the said shaft 18. Normally resting on the lever 31 is the reciprocating plunger 35 passing through a perforated boss 36 carried by the table 2 and carrying at its upper end a block 37 adapted to reciprocate with said plunger 35. Also, mounted on the table 2 is a plate 40 secured to said table as by the bolts 41, and provided with a perforation or orifice 42 into which said block 37 fits. Located on the outer surface of said orifice 42 and firmly secured to said plate 40 are the knives or dies 43 of any suitable shape, the upper sharpened edges 44 of which project a slight distance above the upper surface of said plate 40. The cutting roller 7 is adapted to reciprocate above the upper edges 44 of said knives 43, and, the parts are so adjusted that said roller passes only a very small fraction of an inch above said edges 44 but out of contact therewith. In order to properly adjust the distance between the said roller 7 and the upper edges 44 of said knives 43, there is provided in the member 6 the adjusting screw 50 adapted to raise said roller 7, and conveniently located in said member 6 and in pockets in said reciprocating bar 5 are the springs 51 adapted to lower said roller 7 when the said adjusting screw 50 is slacked off. The member 5 may be conveniently provided with slideways 52 to facilitate the said adjustment.

55 represents the leather or other sheet material it is desired to cut, and 56 represents a sheet of paper or other material which overlies said leather 55 and receives the edges 44 of the knives after they pass through the said leather 55.

The operation of my machine will be readily understood from the foregoing, but may be briefly summarized as follows: Power being applied by any suitable means, not shown, to the shaft 60 on which is mounted the pulley or pulleys 10, the said power is transmitted by the belt 11 to the pulley 12, thence to the shaft 15, the pinion 16, the gear 17, and to the shaft 18. From the shaft 18 power is transmitted to the crank 19, the link 21 and the lever 23, which serves to reciprocate the bar 5 and the cutting roller 7. The knives or dies 43 are of any suitable shape or pattern, and when the roller 7 is in one of its extreme positions, such as is illustrated in Fig. 1, for example, the leather or other sheet material 55 is spread down over the plate 40, together with the paper sheet 56 overlying the said leather 55. The distance of the roller 7 above the edges 44 of the knives having been accurately gaged by the screw 50, to equal the thickness of the leather 55 and about say one half the thickness of the paper sheet 56, the roller 7 will pass over said sheets 55 and 56 and cause the edges 44 of the knives to cut entirely through the leather sheet 55 and partially through the protecting paper sheet 56. The material of the sheet 55 will thus be cut into any desired predetermined pattern, such for example as a portion of a glove and the pattern thus severed from the sheet 55 will rest down in the space 61 between the knives, while the sheet 56 and the remainder of the sheet 55 can be readily removed by hand after the roller 7 has passed over the knives 43. The parts are so timed that when the roller 7 is performing its cutting operation the lever 31 is in its lowest position, as indicated in Fig. 2, but after the said roller has completed its cutting operation the lever 31 will be lifted by the cam 33 and the plunger member 37 will thereupon force the cut out pattern from between the knives 43, so that the sheet 55 can be replaced over said knives and a new pattern be cut therefrom.

It will thus be seen that the operation of the machine may be continuous or intermittent according to the control of the power, and that the patterns may be cut as fast as sheets 55 are placed in position over the knives. It will also be seen that since the cutting roller 7 never contacts with the cutting edges 44 of the knives, the said edges are protected from a metallic contact with the roller 7 and therefore the said knives are not dulled due to metal coming in contact with metal.

It is an important feature of this invention that a protecting sheet of material, such as 56 is provided over the leather sheet 55, so as to prevent the edges of the knives being dulled by the said cutting roller 7. It is further of importance that the texture of the sheet 56 be selected with reference to the character of the material 55 to be cut. In other words, if a clean smooth sharp edge is to be had on the cut out pattern, the texture of the sheet 56 should be firm, and of such a nature that when the cutting edges 44 enter the same the material of the leather sheet 55 will not be carried up into the body of the protecting sheet 56, which would be the case if said sheet 56 were made of soft yielding material, such as felt or a poor quality of blotting paper for example. I have found in actual practice that if kid glove patterns are to be cut out, a calendered paper material of about the quality that file jackets or file envelops are usually made is very satisfactory in that it presents a smooth and firm surface and the knives make a clean cut into its body without any of the kid material being carried thereinto whatever. Substantially the same operation is had when materials other than leather are employed. For example, cloth patterns may be cut out in the same manner, as well as rubber patterns and in fact any patterns that are usually made from sheet material.

It will be appreciated by those skilled in the art that by cutting out the patterns thus singly I avoid all of the objections which have heretofore existed in the cutting out of a plurality of patterns at the same time and wherein the cutting knives must of necessity pass through a plurality of thicknesses. In other words, it is well recognized by those skilled in the art that in such cases the upper patterns are of a different size from the lower patterns and that inaccuracy in the patterns, as well as other objections thereto inevitably result. On the other hand, by cutting out single patterns as above described, not only is an extreme accuracy obtained, but a very high rapidity of operation is also attained, while the knives are not dulled through contact of metal with metal.

It is obvious that those skilled in the art may vary the details of construction, as well as the method of operation, without departing from the spirit of my invention, and therefore I do not wish to be limited to the above disclosure except as may be required by the claims.

What I claim is:

1. In a machine for cutting patterns from sheet material, the combination of cutting edges, over which the material to be cut may be placed; a roller adapted to be reciprocated over and out of contact with said edges; and means located between said roller and edges adapted to cause the latter to cut entirely through said sheet material when said roller passes over said edges, substantially as described.

2. In a machine for cutting patterns from sheet material the combination of metal cutting edges; over which the material to be cut may be placed; a metal roller adapted to be reciprocated over and out of contact with said edges; a protecting sheet of material located between said roller and said edges; and means to adjust the distance between said roller and said edges, whereby said edges will be caused by said roller to pass entirely through said first named sheet, and only partially through said protecting sheet, substantially as described.

3. In a machine for cutting patterns from sheet material, the combination of a power shaft; an oscillating lever; connections between said shaft and lever; a reciprocating bar connected to said lever; a reciprocating roller carried by said bar; cutting edges located below the path of movement of said roller; means to adjust said roller a predetermined distance above said edges; and a plunger associated with said edges adapted to reciprocate above and below the same, substantially as described.

4. In a machine for cutting patterns from sheet material, the combination of a power shaft; an oscillating lever; connections between said shaft and lever; a reciprocating bar connected to said lever; a reciprocating roller carried by said bar; cutting edges located below the path of movement of said roller; means to adjust said roller a predetermined distance above said edges; a plunger associated with said edges adapted to reciprocate above and below the same; a lever for operating said plunger; and a cam for operating said last named lever, the parts being so timed that said plunger will rise above said edges when said roller is to one side of the same, and will remain below said edges when said roller is over said edges, substantially as described.

5. In a machine for cutting patterns from sheet material associated with a protecting sheet, the combination of cutting edges over which said material and protecting sheet may be placed; a pressure means adapted to be reciprocated over and out of contact with said edges; and means to so adjust said pressure means as to provide between its pressure surface and said edges a space for said material and protecting sheet, said space being less than the combined thickness of said material and protecting sheet, substantially as described.

6. In a machine for cutting patterns from sheet material associated with a protecting sheet, the combination of cutting edges over which said material and protecting sheet may be placed; a pressure means comprising a roller adapted to be reciprocated over and out of contact with said edges; a plunger associated with said edges adapted to reciprocate above and below the same; and means to so adjust said pressure means as to provide between its pressure surface and said edges a space for said material and protecting sheet, said space being less than the combined thickness of said material and protecting sheet, substantially as described.

In testimony whereof I affix my signature, in presence of two witnesses.

OSCAR B. RONEY.

Witnesses:
L. G. BARNARD,
O. G. RONEY.